United States Patent [19]

McGill, Jr. et al.

[11] 3,729,587

[45] Apr. 24, 1973

[54] VOLTAGE TUNABLE FREQUENCY THRESHOLD CIRCUIT

[75] Inventors: Robert L. McGill, Jr., Fallston; Charles R. Worsham, Towson; Norman Green, Timonium, all of Md.

[73] Assignee: Bendix Corporation, Southfield, Mich.

[22] Filed: July 12, 1971

[21] Appl. No.: 161,673

[52] U.S. Cl. ....................178/88, 325/320, 329/110, 329/126

[51] Int. Cl. ....................H04b 1/16

[58] Field of Search..................324/78 R, 78 D, 78 E, 324/78 J, 78 Q, 78 Z; 325/344, 349; 329/110, 111, 126, 192; 307/233; 328/140, 141

[56] References Cited

UNITED STATES PATENTS

| | | | |
|---|---|---|---|
| 3,351,939 | 11/1967 | Olsen et al. | 324/78 Q |
| 3,529,247 | 9/1970 | Nelson | 328/140 |
| 3,473,133 | 10/1969 | Hummel | 329/126 |
| 3,585,508 | 6/1971 | Crowther | 324/78 E |

*Primary Examiner*—Benedict V. Safourek
*Attorney*—Bruce L. Lamb et al.

[57] ABSTRACT

A circuit having a voltage tunable threshold generates an output signal indicative of whether an input signal frequency is above or below the threshold frequency. A ramping signal is started and terminated at predetermined points on the input signal frequency waveform. The ramp amplitude at termination is compared against a d.c. reference voltage proportional to the threshold frequency to indicate whether the input signal frequency is above or below the threshold. The threshold circuit is also shown used in an adaptive frequency shift keying demodulator. The demodulator threshold analyzes a received reference frequency and generates a d.c. reference voltage level for the frequency threshold circuit proportional to the reference frequency.

15 Claims, 6 Drawing Figures

INVENTORS
NORMAN GREEN
ROBERT L. McGILL, JR.
CHARLES R. WORSHAM
BY
William G. Christoforo
ATTORNEY INVENTORS
NORMAN GREEN
ROBERT L. McGILL, JR.
CHARLES R. WORSHAM
BY
William G. Christoforo
ATTORNEY

INVENTORS
NORMAN GREEN
ROBERT L. MCGILL, JR.
CHARLES R. WORSHAM

BY
William G. Christoforo
ATTORNEY

Patented April 24, 1973 3,729,587

4 Sheets-Sheet 4

INVENTORS
NORMAN GREEN
ROBERT L. McGILL, JR.
CHARLES R. WORSHAM
BY William G. Christoforo
ATTORNEY

VOLTAGE TUNABLE FREQUENCY THRESHOLD CIRCUIT

This invention relates to electronic frequency comparators and more particularly to such comparators which operate on digital principles and which determine the relationship of an input frequency signal with respect to a reference frequency where the reference frequency is represented by a d.c. voltage level.

Convention frequency threshold circuits generally use saturable reactors. Related frequency shift key (FSK) demodulators use ordinary FM discriminators. Neither of the above means produce digital information on a cycle by cycle basis.

A new frequency threshold circuit is disclosed herein which is particularly adapted for packaging in microcircuit form. An input signal whose frequency is to be determined to be above or below a preset threshold is applied to the circuit. At the beginning of each cycle of the input signal, a voltage ramp is started. At the end of the cycle, the ramp is returned to base voltage, ready for the start of the next ramp. The peak voltage reached by the ramp is inversely proportional to the frequency of the input audio signal. A measurement of this peak voltage is a convenient way of determining the input audio frequency. Comparison of this peak voltage against an arbitrary reference voltage determines whether the input frequency is greater or less than some arbitrary reference frequency proportional to the reference voltage. The circuit threshold may now be simply varied by changing the reference voltage.

There will also be shown below an adaptive frequency shift key (FSK) demodulator using the above mentioned threshold circuit. At the beginning of a message the modulator receives a tone whose frequency is related to the center frequency of the anticipated FSK frequency scheme. Simultaneously with the receipt of this tone signal, the demodulator sweeps the d.c. reference level until an output signal is generated. At this time, the instantaneous d.c. reference level corresponding to the center frequency is memorized and applied as a reference level to the frequency threshold circuit. The demodulator is thus set to demodulate the subsequent FSK signal.

It is an object of this invention to provide a frequency threshold circuit which uses s d.c. reference level proportional to a frequency threshold.

It is another object of this invention to provide a frequency threshold circuit which is particuarly adapted to packaging in microcircuit form.

It is a further object of this invention to provide an adaptive frequency shift key demodulator.

These and other objects of the invention will be made clear in the following description and appended claims.

DESCRIPTION OF THE PREFERRED EMBODIMENT

Figure 1:
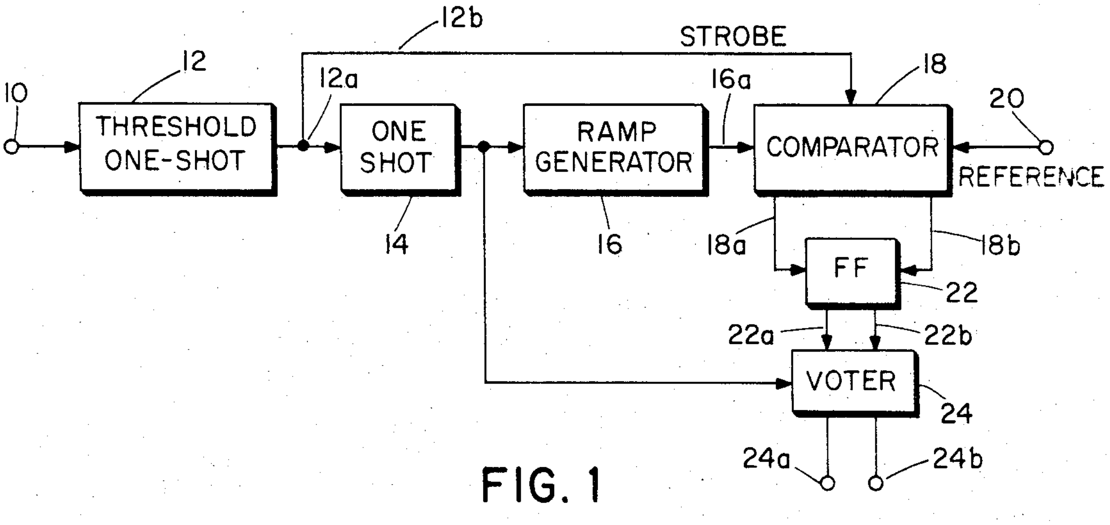
FIG. 1 is a block diagram of the voltage tunable frequency threshold circuit.

Refer to the figures wherein like reference numerals in the various figures refer to like elements, and refer particularly to FIG. 1 wherein there is seen a block diagram of a frequency threshold circuit illustrating the principles of this invention. An input terminal 10 receives an electric signal whose frequency is to be determined to be above or below a preset threshold. This input signal is seen at line A of FIG. 2, reference to which figure should now also be made. This input signal frequency is applied to threshold one-shot 12 which in response thereto generates an output pulse, seen at line C of FIG. 2 as pulse 13, when the input waveform, as illustrated at line B of FIG. 2, reaches a predetermined point represented at point 11. This one-shot pulse is applied via line 12*a* to a second one-shot 14 which generates a second output pulse 15, seen at line D of FIG. 2, when triggered by the trailing edge of pulse 13. Pulse 15 triggers ramp generator 16 which in response to the leading edge of pulse 15 terminates a previous ramp and in response to the trailing edge of pulse 15 initiates a new ramp. The ramps generated are illustrated at line E of FIG. 2. This ramping signal is applied via line 16*a* to comparator 18 wherein it is compared to a d.c. voltage reference level which is applied to terminal 20. This d.c. reference level is shown as broken line 21 in FIG. 2E.

Figure 2:
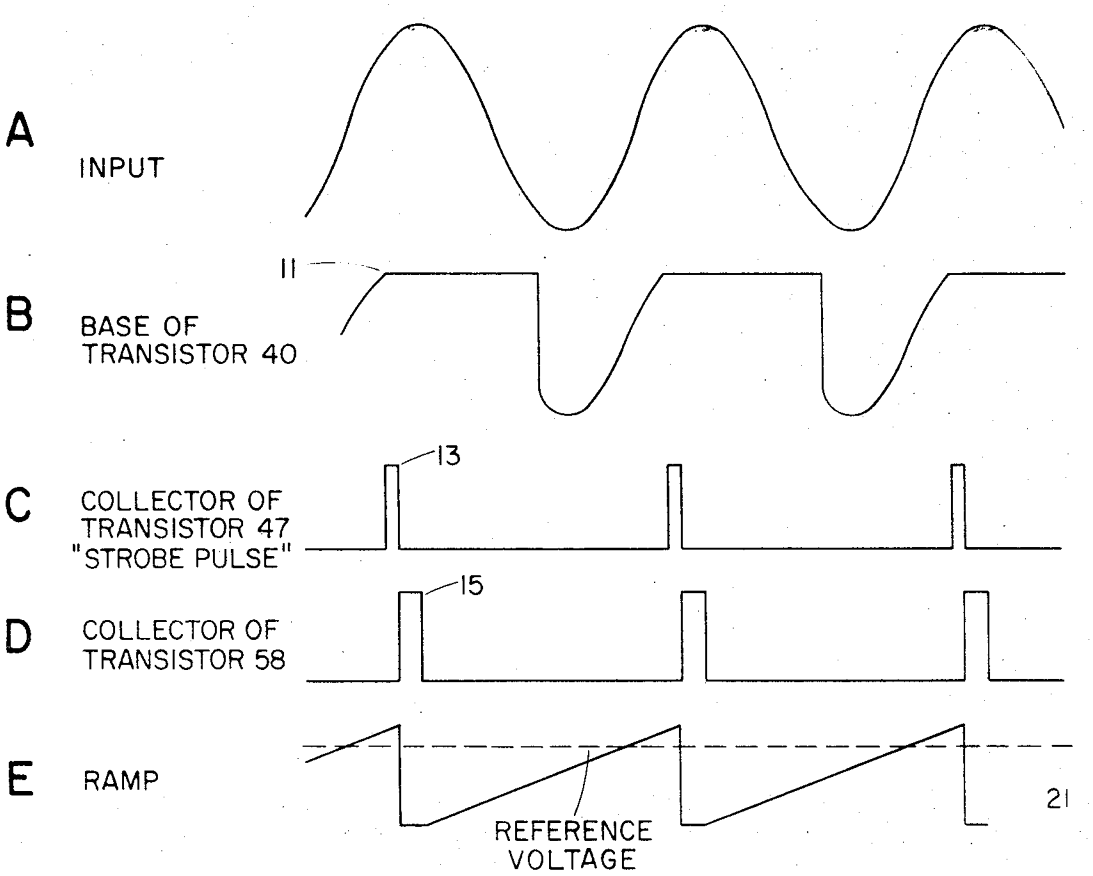
FIG. 2 shows the electrical waveforms of signals taken at various points in the circuit of FIG. 1.

Threshold one-shot 12 is designed to generate an extremely narrow output pulse. This output pulse 13 in addition to being applied to trigger one-shot 14 is also applied via line 12*b* to comparator 18. Examination of FIG. 2 shows that pulse 13 is generated when the ramp of line E is at a maximum. Pulse 13 is designated a strobe pulse since it energizes comparator 18 to read instantaneously whether the ramping signal on line 16*a* exceeds the value of the d.c. reference level on terminal 20. In effect, comparator 18 steers pulse 13 either onto output line 18*a* or onto output line 18*b* depending on which of the comparator input signals is higher. Output lines 18*a* and 18*b* now provide on a cycle by cycle basis information as to whether the input signal frequency is above or below the preset threshold. These lines may be connected respectively to the set and reset terminals of a flip flop, for example, flip flop 22. This flip flop provides a continuous output on either line 22*a* or 22*b* so long as the input signal frequency remains above or below the reference frequency corresponding to the d.c. voltage reference. This device as thus far described might suitably be used as a frequency alarm to provide an indication that a relatively constant input frequency has not violated the threshold. Where some uncertainty or noise is present in the input signal frequency, a voter circuit 24 is provided which may receive its input either from the flip flop or directly from comparator 18, as will become obvious to one skilled in the art as the description proceeds. Voter circuit 24 may, for example, comprise a shift register which enters a signal of one polarity if line 22*a* or 18*a* is energized and a signal of opposite polarity if line 22*b* or 18*b* is energized. The information in the voter circuit is shifted by one of the one-shot output pulses, in this embodiment the output pulse of one-shot 14. At the completion of a predetermined number of entries into voter circuit 24 the circuit contents are weighed to determine whether it contains a preponderance of the first or second polarity signals, and generates an output on terminal 24*a* or 24*b* in accordance therewith. For example, assuming that voter circuit 24 will take seven consecutive samples before generating an output and that during the seven samples comparator 18 steered the strobe pulses 13 into line 18a five times and into line 18*b* two times, the voter circuit will determine that the proper reading taken over the seven samples will be to indicate that the input frequency is of such value as to generate an output at line 18*a*. The voter circuit will accordingly provide this information at one of its output terminals, for example, at output terminal 24*a*.

Figure 3:
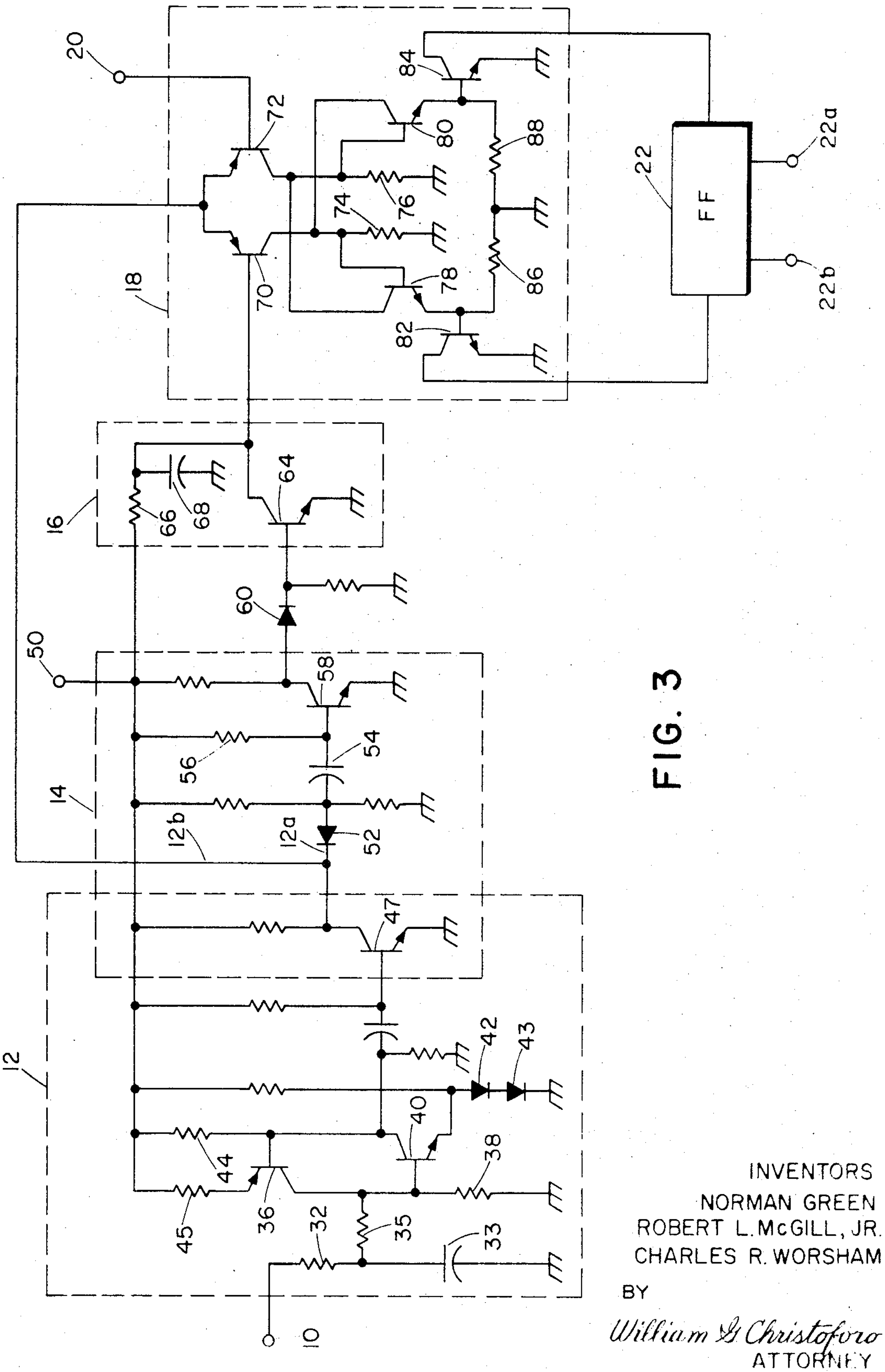
FIG. 3 is a schematic of the voltage tunable frequency threshold circuit.

Refer now to FIG. 3 which shows the schematic of the frequency threshold circuit of FIG. 1 in greater detail. The input frequency signal is applied to the input terminal 10. A resistor 32 and capacitor 33 are serially connected between input terminal 10 and ground (the signal return circuit). A resistor 35 connects the common junction of resistor 32 and capacitor 33 with the base-electrode of NPN transistor 40. A further resistor 38 is connected between the base-electrode of transistor 40 and ground. The input frequency signal at terminal 10 is divided down by resistors 32, 35 and 38 and filtered by capacitor 33 before being applied to the base-electrode of transistor 40. Diodes 42 and 43 are connected between the emitter-electrode of transistor 40 and ground and provide a threshold of about 1.2V at the base of transistor 40. This in effect provides that when the voltage at the base of transistor 40 is increasing in the positive direction, transistor 40 turns on at about 1.2V. The collector-electrode of transistor 40 is connected through resistor 44 to a source of regulated A+ voltage at terminal 50, and is additionally directly connected to the base-electrode of NPN transistor 36. The emitter-electrode of transistor 36 is connected through resistor 45 to terminal 50 and its collector-electrode is connected directly to the base-electrode of transistor 40. Thus, when transistor 40 turns on base current is drawn from transistor 36 thus turning that transistor on and latching transistor 40 on due to the base current provided to transistor 40 from the collector-electrode of transistor 36. This provides for a fast turn on of transistor 40 even in the case of low frequencies (slowly changing) input signals. The turn-on point of transistor 40 on the input waveform is shown at line B of FIG. 2. The flat portion 11 of that curve indicates the time during which transistor 40 is on. Note, that transistor 40 remains on during the first part of the negative half-cycle of the input frequency signal. This is so since transistor 36 provides base current to transistor 40, thus when transistor 40 is on this current must be overcome by the input signal before transistor 40 turns off. Transistor 40 and NPN transistor 47 together with the other shown circuit elements comprise a conventional one-shot whose output pulse is generated simultaneously on the common lines 12*a* and 12*b*. It should be noted that when the threshold one-shot is triggered so that transistor 40 conducts transistor 47 is turned off so that the one-shot output pulse appearing at the collector of this latter transistor is a positive going pulse.

An NPN transistor 58 has its base-electrode connected through resistor 56 to voltage source 50 and its emitter-electrode connected to ground and is thereby normally conductive. The base-electrode of this transistor is also connected through diode 52 and capacitor 54 to the collector-electrode of transistor 47. Transistor 58 together with resistor 56, capacitor 54 and the collector-electrode of transistor 47 comprise a second one-shot which is triggered at the trailing edge of pulse 13, that is the output pulse of one-shot 12 appearing at the collector-electrode of transistor 47 and seen at line C of FIG. 2. In response to this trailing edge which turns off transistor 58, the voltage at the collector-electrode of this latter transistor rises at the leading edge of pulse 15 (FIG. 2). This rising voltage passes through diode 60 and triggers NPN transistor 64 conductive. Diode 60 is connected between the collector-electrode of transistor 58 and the base-electrode of transistor 64. The capacitor 68 shunted across the collector-emitter circuit of transistor 64 is discharged when that transistor conducts. At the completion of the one-shot 14 output pulse, transistor 64 once more turns off and charges flowing from the voltage source at terminal 50 through resistor 66 into capacitor 68 will cause the voltage across that capacitor to ramp upwards. The voltage at the collector-electrode of transistor 64 will thus ramp upwards in accordance with the time constant determined by resistor 66 and capacitor 68.

A comparator comprised basically of differentially connected PNP transistors 70 and 72 have commonly connected emitter-electrodes connected to receive the one-shot 12 output pulse via line 12*b* and collector-electrodes connected respectively through resistors 74 and 76 to ground. The comparator also comprises speed up NPN transistors 78, 80, 82 and 84. The collector-electrode of transistor 78 is connected to the collector-electrode of transistor 72 while the collector-electrode of transistor 80 is connected to the collector-electrode of transistor 70. The base-electrode of transistor 78 is connected to the collector-electrode of transistor 70 and the base-electrode of transistor 80 is connected to the collector-electrode of transistor 72 thus cross coupling these transistors. The emitter-electrode of transistor 78 is connected to the base-electrode of transistor 82 and through resistor 86 to ground while the emitter-electrode of transistor 80 is connected to the base electrode of transistor 84 and through resistor 88 to ground. The emitters of transistors 82 and 84 are commonly connected to ground.

The ramping voltage on the collector of transistor 64 is applied as one input to comparator 18 at the base electrode of transistor 70 while a reference d.c. voltage level (from a source not shown) at terminal 20 is applied as a second input to comparator 18 at the base electrode of transistor 72. Comparator 18 is normally deenergized until one-shot pulse 13 is generated and conveyed via line 12*b* to the common emitter-electrodes of transistors 70 and 72. At that time, the transistor whose base electrode is less positive will conduct while the other transistor will remain off. In effect, this permits the ramping voltage to be compared against the reference voltage when the ramp is a maximum and just before the ramp is terminated and begins again by the action of pulse 15 on transistor 64, which it will be remembered, renders that transistor conductive to discharge ramping capacitor 68 and at the termination of pulse 15 transistor 64 again turns off to allow the voltage across capacitor 68 to once again ramp upwards.

The comparator has a cross coupling feature which provides a sharp threshold to thereby prevent any uncertainty in its comparison. If, for example, the voltage at the base electrode of transistor 70 is less than the voltage at the base of transistor 72 at the time of the strobe pulse 13, transistor 70 turns on when the strobe pulse occurs. Current from the collector-electrode of transistor 70 turns on transistor 78 which robs any remaining current flowing through transistor 72 insuring that as transistor 70 is biased on transistor 72 is biased off. As aforementioned, this cross coupling prevents an uncertainty which might occur should the ramping voltage at the base electrode of transistor 70 be initially lower than the reference voltage at the beginning of the strobe pulse but increase during the time of the strobe pulse to be greater than the reference voltage. In this case, the cross coupling insures that transistor 70 will remain conductive.

The circuit output signal may be taken optionally from any one of a number of points. For example, a signal indicating that the input frequency is higher than the reference frequency may be taken from the collector-electrode of transistor 70 while a signal indicating that the input frequency is lower than a reference frequency may be taken from the collector-electrode of transistor 72. Like signals may also optionally be taken respectively from the collector-electrodes of transistors 82 and 84. Also optionally the comparator output signals may be applied to the set and reset terminals of flip flop 22 with the circuit output signals now also being available at flip flop output terminals 22*a* and 22*b*.

The frequency threshold circuit as described to this point is characterized by its operation in accordance with digital principles, its reference d.c. voltage level proportional to the reference frequency and the cross coupling feature of the comparator which prevents uncertainties in the comparisons thereby allowing the circuit to closely recognize whenever an input frequency is above or below the reference frequency.

Figure 4:
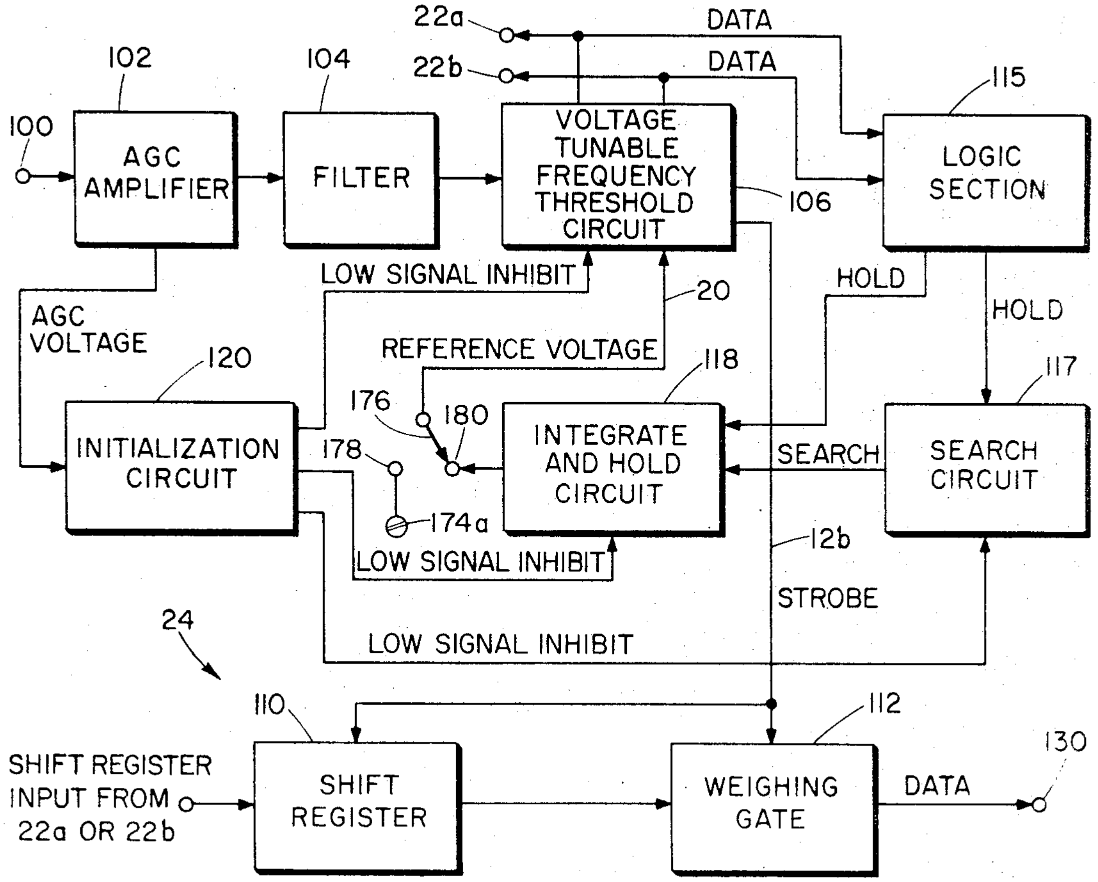
FIG. 4 is a block diagram of a practical demodulator using the above described frequency threshold circuit.

FIG. 4 shows a demodulator for an FSK teletype system which uses a frequency threshold circuit of the type just described. In particular, the system of FIG. 4 takes advantage of the fact that a d.c. reference level proportional to the reference frequency is used. This permits an adaptive demodulator which automatically sets its reference d.c. level in accordance with a message received to be easily constructed.

FSK teletype system messages are characterized by pulses comprised of either a plurality of cycles of relatively high frequencies or a plurality of cycles of relatively low frequencies. A pulse comprised of relatively high frequencies is termed a mark while a pulse of relatively low frequencies is termed a space. The spaces and marks convey information. A center frequency can be defined between the high and low frequencies with frequencies above the center frequency being the relatively high frequencies and determinative of a mark and frequencies below the center frequencies being the relatively low frequencies and determinative of a space. It should now be obvious that the voltage tunable frequency threshold circuit may be simply used as a FSK demodulator by providing a d.c. reference level proportional to the aforementioned center frequency. In a practical FSK teletype system the mark and space frequencies applied to the input of the demodulator comprised, for example, a pair of tones 400 Hz apart which lay within the band from 0 to 4 KHz. These frequencies are mentioned only by way of illustration and not by way of limitation. The frequencies which may be used are limited generally by the ability of the elements to respond thereto. Refer now to FIG. 4 where a block diagram of an adaptive FSK demodulator is seen. An input signal comprised of a pair of tones, for example, the aforementioned pair of tones 400 Hz apart within the band from 0 to 4 KHz and thus comprising an audio input, is applied to input terminal 100 and then processed in automatic gain control (AGC) amplifier 102. The amplified and controlled audio output from amplifier 102 is applied to filter 104 which amplifies and filters the audio signal to provide a sinusoidal input to a voltage tunable frequency threshold circuit 106 which is essentially identical to the frequency threshold circuit previously described. As previously mentioned, the output from the frequency threshold circuit may be taken from any of a number of points. In this particular embodiment, the outputs are designated 22*a* and 22*b* to correspond with the outputs shown in FIG. 3. These data outputs from the frequency threshold circuit are connected to the voter circuit 24 comprised of shift register 110 and weighing gate 112. In particular, the data terminals 22*a* and 22*b* are connected to shift register 110 while the strobe pulse from the frequency threshold circuit is applied via line 12*b*, seen here and also in FIG. 3, to the weighing gate 112 and shift register 110.

The data at terminals 22*a* and 22*b* is also applied to a logic section 115 which, upon receipt of data, generates hold signals which are applied to a search circuit 117 and an integrate and hold circuit 118. An initialization circuit 120 receives AGC voltage from AGC amplifier 102 and in the absence of the AGC voltage, which indicates the absence of input at terminal 100, generates an inhibit signal which is applied to the frequency threshold circuit 106, integrate and hold circuit 118 and search circuit 117.

Messages are sent by a transmitting station to a receiving station which includes this demodulator. The messages are normally short with quiescent periods between messages. The transmitting station will transmit an initial relatively long burst, on the order of a half-second, of the relatively high frequency of the pair of tones to comprise the signal frequencies of the message to follow. Of course, during the quiescent period between messages and before the initial relatively long burst, no AGC voltage has been generated and hence initialization circuit 120 has inhibited the frequency threshold circuit 106 together with the integrate and hold circuit 118 and the search section 117. When the message is received at terminal 100 the AGC voltage is generated to thus remove the inhibit signals and in addition the tone is applied to the voltage tunable frequency threshold circuit 106 through filter 104. Simultaneously, search circuit 117 generates a search signal which is applied to the integrate and hold circuit which in response thereto sweeps the reference voltage applied to terminal 20 of the voltage tunable frequency threshold circuit from a high extreme to a low extreme voltage. Terminal 20 is seen also in FIGS. 1 and 3. The reference is swept relatively slowly and of course during at least the initial portion of the sweep the reference voltage is above the maximum ramp voltage and the data output from the voltage tunable frequency threshold circuit indicates that the input frequency is below the reference frequency. This condition exists until the reference voltage is swept to a slightly lower value than the maximum ramp voltage at which time the data output indicative of this condition triggers logic section 115 to generate its hold signal thus causing search section 117 to extinguish the search signal and additionally causing the instantaneous reference voltage generated by the integrate and hold circuit to be, in effect, displaced slightly upward so as to approximate a reference voltage proportional to the center frequency. The demodulator is now in condition to receive the message which is received, as aforementioned, approximately one-half second after initial receipt of the first tone.

Of course, if the mark and space frequencies are extremely low, a longer initial tone and a slower search speed might be required for the proper center frequency to be found.

The demodulated data is entered into shift register 110 which, by way of example, may consist of seven stages. Each bit of data entered into the shift register comprises a determination of whether a single cycle of the input frequency is above or below the center frequency. Each strobe pulse moves the data into the shift register and additionally qualifies a weighing gate which considers the seven latest bits corresponding to the seven latest cycles received as stored in the shift register and generates an output on terminal 130. Although the addition of the voter circuit delays the output of the demodulator by that number of input frequency cycles equal to the capacity of shift register 10, which in this embodiment is seven cycles, it can be seen that the use of the voter circuit enhances the performance of the demodulator particularly under conditions of low signal to noise ratio. It should be obvious that the use of a voter circuit is optional and, in fact, other types of signal enhancement means can be used if the circuit designer so desires.

Figure 5:
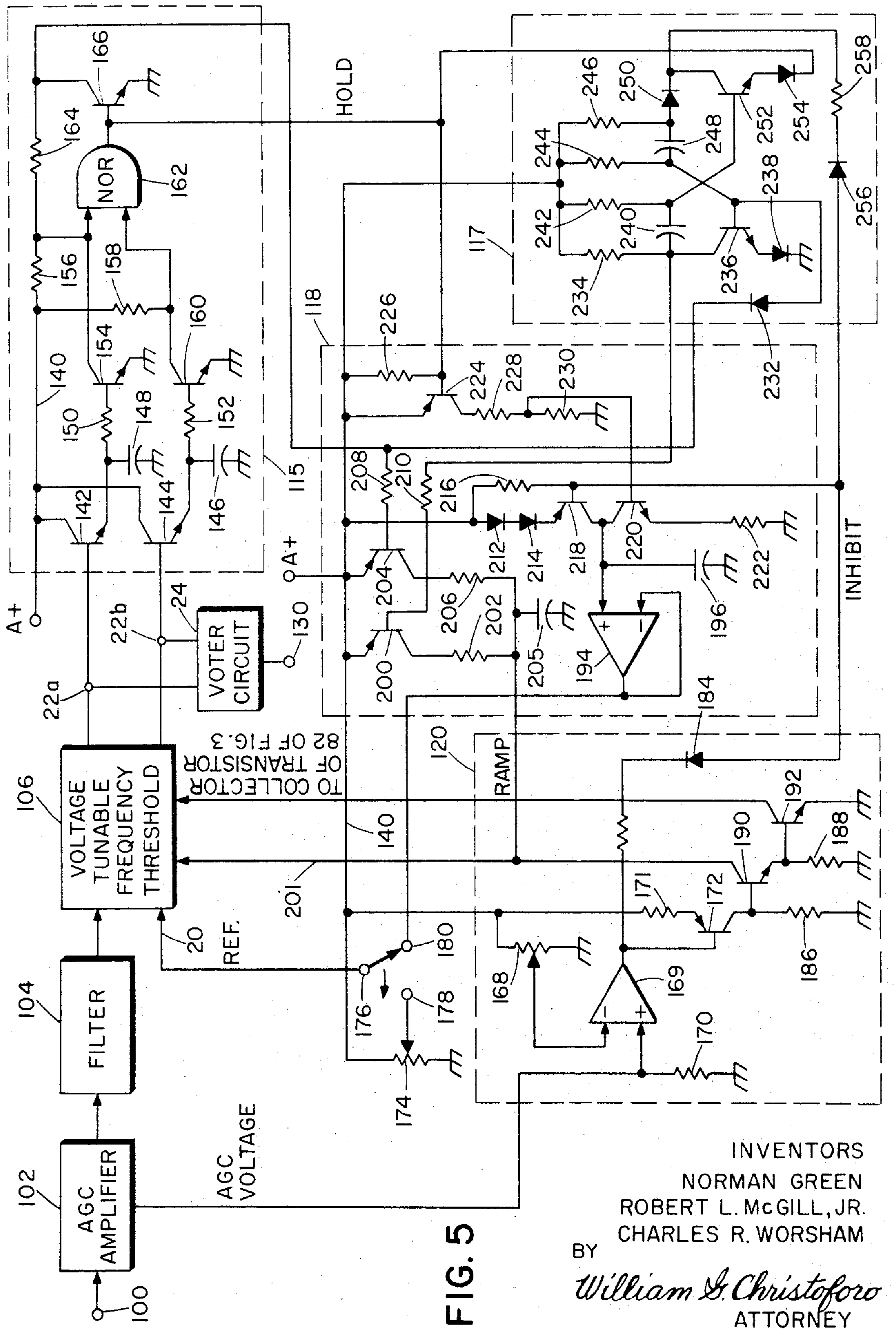
FIG. 5 is a schematic showing in greater detail the demodulator of FIG. 4.

Refer now to FIG. 5. In this figure, it should be understood that the ramp generator of FIG. 3, comprised of resistor 66 and capacitor 68 of that figure, is not contained in box 106 labeled Voltage Tunable Frequency Threshold (FIG. 5) but has been shown as part of the integrate and hold circuit 118. In particular, capacitor 205 of FIG. 5 represents capacitor 68 of FIG. 3 while resistors 202 and 206 of FIG. 5 represent resistor 66 of FIG. 3. PNP transistors 200 and 204 of FIG. 5 are not seen or required in FIG. 3, however, their need and use in the embodiment of FIG. 5 will become apparent as the description proceeds. It should also be understood that in FIG. 5 box 106 includes a transistor equivalent to transistor 64 of FIG. 3 with this transistor being effective to discharge capacitor 205 via line 201 in essentially identical manner as produced by the action of transistor 64 of FIG. 3. In essence, the operation of the voltage tunable frequency threshold of FIG. 5 together with the ramping capacitor 205 and its associated resistors is essentially identical to the operation of the circuit seen in FIG. 3.

More particularly, in FIG. 5 an audio input signal is impressed at terminal 100 and processed by AGC amplifier 102 to produce an amplified and gain controlled signal which is filtered by filter 104 to produce a sine wave input for a voltage tunable frequency threshold 106. As previously described, this input frequency is compared aginst the d.c. reference applied via line 20 by means of a ramping voltage applied via line 201. Resultant data appears at terminals 22a and 22b with the data being applied to voter circuit 24 for signal enhancement with the resultant data appearing at terminal 130 as previously described.

Assume now that the circuit of FIG. 5 is in a quiescent state, that is, no message is being received so that the AGC amplifier 102 is generating no AGC voltage. Additionally assume that terminal 176 is connected to terminal 180 as shown. Under these conditions, as will be explained more fully below, the output from operational amplifier 169 is low so that PNP transistor 172 whose base electrode is connected to receive the output from the operational amplifier is now conductive and current is drawn through its emitter- collector circuit, comprised of resistors 171 and 186, from the A+ voltage line 140. As a result, NPN transistor 190 whose base-electrode is connected to the collector-electrode of transistor 172 is also conductive to thus discharge ramping capacitor 205 through its emitter resistor 188. In like manner, NPN transistor 192 whose base-electrode is connected to the emitter-electrode of transistor 190 is also conductive thus grounding the collector-electrode of transistor 82 of FIG. 3 which is contained within box 106. This action resets flip flop 22 of FIG. 3 so that a high signal appears at data terminal *22b* and a low signal appears at data terminal *22a*, these terminals being seen both in FIG. 5 and FIG. 3. It will be remembered that during normal operation of the frequency threshold circuit described in FIG. 3 data terminal *22b* is high when the reference d.c. voltage level is above the maximum ramp voltage.

Since the output of operational amplifier 169 is low while the circuit is in a quiescent state diode 184 is conductive and effective to apply an inhibit signal to the integrate and hold circuit 118 and the search circuit 117 as follows. With diode 184 conductive, current is drawn from the A+ bus 140 through diodes 212 and 214 and through the emitter base diode of PNP transistor 218. As a result, the collector-emitter circuit of transistor 218 is saturated fully charging capacitor 196 to the A+ voltage level, (except for the drop across diodes 212 and 214). Capacitor 196 which has one side grounded and now has the other side charged essentially to the A+ voltage level, which other side is connected to the positive input terminal of operational amplifier 194 which is connected as a unity amplifier having high input impedance, causes a high voltage reference level to be generated at terminal 180 which is applied through switch arm 176 to the reference input 20 of the voltage tunable frequency threshold 106. In addition the inhibit signal from the initialization circuit 120 back-biases diode 256, the significance of which will be explained below.

With a high signal now (quiescent state) at terminal *22b* and low signal at terminal *22a* NPN transistor 144, whose base-electrode is connected to the terminal *22b*, is conductive thus charging capacitor 146 in its emitter circuit and applying base drive through resistor 152 to NPN transistor 160. As a result transistor 160 whose emitter-electrode is grounded and whose collector-electrode is connected through resistor 158 to A+ bus 140 and additionally connected as one input to Nor gate 162, is now conductive thus grounding the input at the Nor gate. On the other hand, NPN transistor 142 whose base-electrode is connected to terminal 22*a* is non-conductive and remains non-conductive so long as no input signal is received at terminal 100, thus capacitor 148 in its emitter circuit will discharge through resistor 150 and the base-emitter diode of transistor 154. Once capacitor 148 is discharged no base drive is applied to transistor 154 so that it is non-conductive and its collector-electrode, which is connected to the A+ bus 140 through resistor 156 and also as an input to Nor gate 162, goes to the A+ voltage level. As a result Nor gate 162 is closed generating a low signal at its output. As a further result NPN transistor 166 whose emitter-electrode is grounded and whose collector-electrode is connected to the A+ bus 140 through resistors 156 and 164 is non-conductive. This A+ voltage at the collector-electrode of transistor 166 is applied to the base-electrode of PNP transistor 204 through resistor 208 thus holding that transistor non-conductive to prevent capacitor 205 from being charged therethrough. In addition, the A+ voltage back-biases diode 232, the significance which will be made apparent below.

It will be noted that with the circuit in the quiescent state PNP transistor 225 whose emitter-electrode is connected to the A+ voltage bus 140 and whose base-electrode is similarly connected thereto through resistor 226 is conductive thus permitting current to flow in its collector circuit resistors 228 and 230. Accordingly, NPN transistor 220 whose base-electrode is connected into the collector circuit of transistor 224 and whose emitter-electrode is connected through resistor 222 to ground is also conductive. Since the collector-electrode of transistor 220 is connected to the high side of capacitor 196 this latter capacitor tends to discharge slightly through conductive transistor 220. However, resistor 222 is made sufficiently large that this discharge, especially in light of the charging current through conductive transistor 218, is slight.

With the circuit in a quiescent state search circuit 117, which is essentially a multivibrator comprised of NPN transistors 236 and 252, together with capacitors 240 and 248 is operating, since diode 232 is back-biased while diode 254 located in the emitter circuit of transistor 252 is forward-biased to connect the emitter of that transistor to the low signal at the output of Nor gate 162. The operation of the multivibrator causes transistor 200 to alternately conduct since its base-electrode is connected through resistor 210 to the collector-electrode of multivibrator transistor 236. However, since as aforementioned, transistor 190 is now conductive ramping capacitor 205 cannot charge to any appreciable value.

Figure 6:
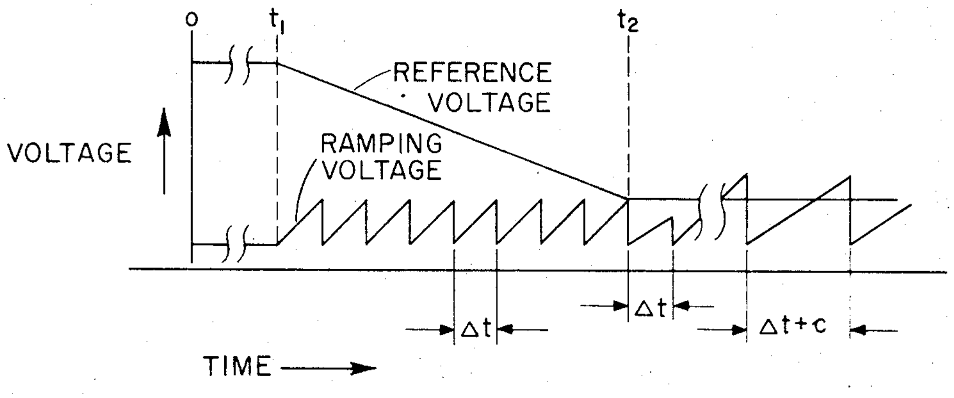
FIG. 6 is a graph which explains the operation of the demodulator while in the search mode.

FIG. 6 is a graph showing the reference voltage and the ramping voltage during the adaptive portion of the operation of the demodulator. Reference to this figure should now be made. In this figure the time from zero to $t_1$ is the quiescent time of the demodulator where it can be seen the reference voltage appearing at the output of operational amplifier 194 is high while the voltage at ramping capacitor 205 is low.

Return now to FIG. 5 and assume that an FSK message is now being received at input terminal 100. It will be remembered that the initial portion of this message will be a pure audio tone at the relatively high frequency. Accordingly, AGC amplifier 102 will generate an AGC voltage which is impressed across resistor 170 and applied to the high terminal of operational amplifier 169. The low terminal of this amplifier receives an adjustable signal through potentiometer 168 from the A+ voltage bus 140. Potentiometer 168 performs the function of squelch adjust. With AGC voltage now being applied amplifier 169 generates a high signal which turns off transistor 172 resulting in the turn off of transistors 190 and 192 also. Capacitor 205 is now able to store the charge being supplied through transistor 200 and resistor 202 while simultaneously the ground is removed from the flip flop 22 input of FIG. 3, thus permitting that flip flop to change state in the presence of the proper input conditions. In addition, diode 184 is now back-biased which removes the current base drive from transistor 218 thus turning off that transistor and permitting capacitor 196 to discharge slowly through transistor 220 and resistor 222. It will be remembered that this discharge path is of high resistance thus causing the capacitor to discharge at a slow rate. Accordingly, the voltage at the output of amplifier 194 moves downward slowly. At the same time the voltage across capacitor 205 is ramping upwards to be discharged by the strobe pulses 13 generated within voltage tunable frequency threshold 106. This action is seen at FIG. 6 between times $t_1$ and $t_2$. During this time period, since the reference voltage is higher than the peak ramping voltage, the strobe pulse appears at data terminal 22*b*. At time $t_2$ the peak ramping voltage exceeds slightly the reference voltage so that the strobe pulse now appears at data terminal 22*a*. This causes transistor 142 to conduct, rapidly charging capacitor 148 to thereby cause transistor 154 to conduct to thus apply ground at the second Nor gate input terminal. Of course, since this strobe pulse did not appear at terminal 22*b* transistor 144 becomes non-conductive. How-ever since the discharge of capacitor 146 through resistor 152 and the base-emitter diode of transistor 160 is relatively slow the input to Nor gate 162 from this transistor remains at the ground level so that the gate now generates a high signal. It can be seen that transistors 142 and 144 are effective to rapidly charge capacitors 148 and 146, respectively, but the connection of transistors 154 and 160 permits these capacitors to be discharged only very slowly. Accordingly, the circuit comprised of transistors 142, 144, 154 and 160 and capacitors 146 and 148, together with resistors 150 and 152 is effective to maintain Nor gate 162 open so long as data is being received at terminals 22*a* and 22*b* and is effective to close Nor gate 162, should data not be received for an extended period, for example, during the demodulator quiescent period when terminal 22*b* remains high and terminal 22*a* remains low.

The Nor gate output signal causes transistor 166 to conduct thus grounding its collector-electrode, permitting transistor 204, whose base-electrode is connected through resistor 208 to the collector-electrode of transistor 166, to conduct to charge capacitor 205 from the A+ bus 140 through resistor 206. In addition, the Nor gate output signal back-biases transistor 224 thus turning off transistor 224 resulting in the turn off transistor 220 so that the instantaneous voltage across capacitor 196 is now stored thereon resulting in a constant reference d.c. voltage level being generated by amplifier 194 and applied to the reference terminal 20. In addition, the hold signal from Nor gate 162 back-biases diode 254 thus turning off transistor 252. In addition, it will be noted that the base-electrode of transistor 166 through diode 232 while the emitter-electrode of the transistor 236 is connected to ground through diode 238. This removes any forward bias from transistor 236, thus turning off that transistor also and causing its collector-electrode to go towards the A+ voltage level. This action turns off transistor 200. With transistor 200 thus turned off and transistor 204 saturated ramping capacitor 205 receives its charging current through the latter transistor and resistor 206. For the conditions here assumed, that is that the initial message tone is at the high FSK frequency, resistor 202 is of a lower resistance than resistor 206. This causes the slope of the ramping voltage during the search time between $t_1$ and $t_2$ to be greater than the slope of the ramping voltage after time $t_2$. The reason for this is made clear in FIG. 6, reference to which should now be made once again.

The reference voltage memorized at time $t_2$ should for proper operation of the demodulator correspond to the center frequency of the FSK frequencies. It is thus necessary at time $t_2$ to effectlvely increase the reference voltage. In this embodiment this is accomplished by decreasing the slope of the ramping voltage. Now, if strobe pulses appear at $\Delta t$ intervals the maximum ramp will be below the reference voltage, thus indicating a high frequency is being received. Where the strobe pulses are being received at intervals equal to $\Delta t + C$ corresponding to the low frequency the maximum ramp voltage will be above the reference frequency to indicate low frequency input. Note that strobe pulses are generated at $\Delta t$ intervals during the search mode of operation, that is, while the initial high frequency tone is received. The change of ramping voltage slope at time $t_2$ is designed such that the maximum ramp voltage for relatively high frequencies is the same distance below the reference voltage as the maximum ramp voltage for relatively low frequencies is above the reference voltages. Thus, the reference voltage memorized at time $t_2$ will automatically correspond to the FSK center frequency.

Returning now to FIG. 5, the multivibrator 117 should once more be examined. In this multivibrator resistors 234 and 246 are made equal while resistor 242 is made much larger than resistor 244. This permits the multivibrator to remain in the search mode, that is with the transistor 236 conductive, for a relatively long period of time. If the reference voltage does not find the ramping voltage during the period that transistor 236 is conductive that transistor turns off and transistor 252 turns on. The collector of transistor 252 will then approach ground, thus forward-biasing diode 256 permitting transistor 218 to conduct and recharge capacitor 196 through that transistor and diodes 212 and 214. Because of the relatively low resistance in the capacitor charging circuit the capacitor charges quite rapidly during the short conduction period of transistor 252. When transistor 252 turns off and transistor 236 again turns on the reference voltage will once again decay in an attempt to find the ramping voltage. When the reference voltage now finds the ramping voltage the operation of the modulator will be identical, as previously described, in holding the proper center frequency reference voltage at the output of amplifier 194.

Potentiometer 174, which is connected between the A+ bus 140 and ground and includes tap 178, is slow to indicate that a constant selectable reference voltage can be applied to the voltage tunable frequency threshold reference input 20 via switch 176 when the circuit is to be operated in a non-adaptive mode.

Although the invention has been described with respect to particular embodiments, it should be obvious to one skilled in the art that certain alterations and modifications can be made therein without departing from the teachings herein. For example, the ramping voltage supplies a timing function for the circuit which might be suitably supplied by other means known to those skilled in the art. This timing function might, by way of example, by supplied by a digital clock. Accordingly, the invention is not to be limited by the exact embodiments shown but is to be construed to be covered by the true scope and spirit of the appended claims.

The invention claimed is:

1. A circuit for generating output signal indicative of whether an input frequency signal is above or below a reference frequency wherein said input frequency signal includes an initial frequency tone having a predetermined relationship to a frequency approximately centrally located between a relatively higher frequency and a relatively lower frequency, comprising means for generating a first voltage level proportional to said input frequency;

a source of a reference voltage level proportional to said reference frequency;

means for generating a first output signal when said first voltage level is greater than said reference voltage level and a second output signal when said first voltage level is less than said reference voltage level said first and second output signal comprising said output signal; and, means responsive to said initial frequency tone for sweeping said reference voltage level through a predetermined range of values until a predetermined sequence of said first and second output signals is generated at which time said sweeping reference voltage level is held at a pre-determined relationship with the voltage level proportional to said initial frequency.

2. The circuit of claim 1 wherein said means for generating a first voltage level comprises timing means for generating a voltage level proportional to the time between identical points of successive cycles of said input frequency.

3. The circuit of claim 2 wherein said timing means comprises:

means for generating a pulse each time one of said identical points occurs; and, means responsive to said pulse for generating a voltage ramp and terminating a previous voltage ramp, said means for comparing being responsive to said pulse for comparing the instantaneous value of said voltage ramp with said reference voltage level, said instantaneous value being said first voltage level.

4. The circuit of claim 2 wherein said timing means comprises:

means for generating a strobe pulse at each occurrence of said identical point;

means triggered by said strobe pulse to generate a second pulse; and, a voltage ramp generator responsive to said second pulse for terminating a preceding ramp and initiating the next ramp; and wherein said means for comparing includes means responsive to said strobe pulse for energizing said means for comparing during said strobe pulse whereby the instantaneous value of said ramp is compared with said reference voltage level during said strobe pulse, said instantaneous value comprising said first voltage level.

5. The circuit of claim 4 wherein said comparing means comprises a differentially connected amplifier energizable in a first state for generating said first output signal when said first voltage level is greater than said reference level and energizable in a second state for generating said second output signal when said first voltage level is less than said reference voltage and including means for latching said amplifier in its instantaneous state during the occurrence of each said strobe pulse.

6. The circuit of claim 1 with additionally means for initializing said circuit in the absence of said input frequency.

7. The circuit of claim 1 wherein said input frequency signal includes a relatively pure frequency tone having a predetermined relationship to a center frequency approximately centrally located between a relatively higher frequency and a relatively lower frequency, said circuit additionally comprising:

means responsive to said relatively pure frequency tone for sweeping said reference voltage level through a predetermined range of values; and, means responsive to said output signal for holding the instantaneous value of said sweeping reference voltage level at a level proportional to said center frequency.

8. A circuit for generating an output signal indicative of whether an input frequency signal is above or below a reference frequency comprising:

threshold means responsive to said input signal attaining a preset threshold amplitude for generating a strobe pulse;

means responsive to said strobe pulse for generating a second pulse;

means responsive to said second pulse for initiating a voltage ramp and terminating a previous voltage ramp;

a source of reference voltage level related to said reference frequency;

a voter circuit which considers a plurality of said output signals and generates a final output signal in accordance therewith, said voter circuit comprising a shift register for receiving and storing said plurality of output signals; and, an output circuit for generating said final output signal in accordance with the contents of said shift register.

9. The circuit of claim 8 wherein said means for comparing comprises a differentially connected amplifier having as inputs thereto said voltage ramp and said reference voltage level, said amplifier being energized by said strobe pulse to compare the instantaneous value of said voltage ramp with said reference voltage level during said strobe pulse.

10. The circuit of claim 9 wherein said amplifier includes means for latching said amplifier during the period of said strobe pulse.

11. The circuit of claim 8 with additionally means for sweeping said reference voltage level through a predetermined range of values; and, means responsive to said output signal for holding the instantaneous value of said sweeping reference voltage level.

12. A circuit for generating an output signal indicative of whether an input frequency signal is above or below a reference frequency comprising:

means responsive to said input frequency attaining a preset threshold amplitude for generating a voltage ramp and terminating a preceding voltage ramp;

a source of a reference voltage level related to said reference frequency and including means responsive to a predetermined state of said input signal for sweeping said reference voltage level through a predetermined range of values; and, means responsive to said input frequency attaining said preset threshold amplitude for comparing the instantaneous value of said voltage ramp with said reference voltage, the results of said comparison comprising said output signal.

13. The circuit of claim 12 wherein said means for sweeping includes means responsive to a predetermined sequence of a plurality of said output signals for memorizing the instantaneous value of said reference voltage level.

14. The circuit of claim 12 wherein said input signal includes an initial tone related to a center frequency between a relatively high frequency and a relatively low frequency and wherein the predetermined state of said input signal is comprised of the absence of said input signal and the subsequent presence of said input signal including said initial tone.

15. The circuit of claim 14 wherein said predetermined sequence of a plurality of said output signals comprises a sequence of output signals indicative of no input signal and subsequent output signals indicating that said sweeping reference voltage level has attained a predetermined relationship with said ramping voltage.

* * * * *